Nov. 21, 1967  M. F. GOODMAN ET AL  3,353,476
GASTRONOMIC MACHINE

Filed Jan. 11, 1966  2 Sheets-Sheet 1

INVENTORS:
MYRON F. GOODMAN
PHILLIP CLAUSEN

BY Joseph Hadller
ATTORNEY

INVENTORS:
MYRON F. GOODMAN
PHILIP CLAUSEN
BY Joseph Hadlem
ATTORNEY 3,353,476
GASTRONOMIC MACHINE
Myron F. Goodman, 3301 St. Paul, Apt. 209, Baltimore, Md. 21218, and Phillip Clausen, Oxon Hill, Md.; said Clausen assignor to said Goodman
Filed Jan. 11, 1966, Ser. No. 519,892
1 Claim. (Cl. 99—328)

ABSTRACT OF THE DISCLOSURE

A completely automatically controlled refrigerated cooking device or machine in which there are provided several chambers each separately controlled for the purpose of refrigerating, and then automatically cooking a meal in the device. While the device is to be used for preparing meals on the convenient automated time basis, major food preparation is carried out functionally on the controlled temperature basis.

---

This invention relates to the environmental temperature operations performed on food for human consumption and more particularly to a device for both preserving and preparing automatically a variety of different foods in such manner and sequence that their edibility and nutritional value are maximized.

It is thus an object of our invention to provide cooking means for bringing several different kinds of food to a suitable state of "doneness" simultaneously.

It is a further object of the invention to perform the foregoing without the need for the presence of a human operator during this process of food preparation.

It is still a further object of the instant invention to provide means for accomplishing the foregoing objects without any necessity for handling the food, nor removing it from refrigeration prior to the time of its preparation.

Another object of the invention is to provide means to keep such cooked food warm until used.

This invention, unlike previous so-called automatic cooking units, has the capability of attaining a reproducible state of doneness for all types of fish, fowl, and meat regardless of the size of the cut to be cooked. This capability results from the use of a novel technique for controlling the temperature of the cooking environment. Previous machinery measured the temperature within the cooking chamber and required a human estimate of the time necessary for satisfactory cooking. The instant invention uses the interior temperature of the meat, fish, or fowl as a control. The human operator merely sets a dial to the temperature the interior of the cut must reach to obtain a satisfactory state of doneness. A thermocouple located in an electrically rotatable spit upon which the uncooked food is impaled will automatically terminate the cooking process when the predetermined temperature is obtained, thereby assuring thorough, reproducible cooking of the meat, fish, or fowl. Only by this means is it possible to obtain uniform quality and reproducibility for various types and cuts of meats, fish, and fowl. At times when it is not desirable to use the spit, e.g., when cooking thin cuts of meat, the external temperature of the meat will be used to activate the control system responsible for terminating the cooking. This is not a serious limitation, since for thin cuts of meat the outside temperature of the meat will approximate the internal temperature.

It must be emphasized that for a thick cut of meat, fish or fowl the exterior temperature is a poor indicator of the state of doneness. This is because, for a given external temperature, the internal temperature will vary with the type, thickness, shape, and fattiness of the meat, fish, or fowl. For this reason the internal temperature is the only parameter which is capable of reproducibly designating a particular state of doneness. The utilization of the internal temperature as the control parameter in the termination of the cooking process obviates the necessity of human participation in all but the loading operation.

This device has a structure capable of providing either refrigeration or heating at will, and in a manner not formerly thought to be possible in a single device, because of limitations which were heretofore thought to be inherent in the different structural materials which were heretofore used in the manufacture of these contrasting devices.

There have been a large number of devices in the prior art which were designed to provide an oven or other cooking zone which was arranged to be energized automatically at a predetermined time to cook or warm the contained food which had been placed in them on an earlier occasion in anticipation of this automatic method of preparation. Electric stoves having ovens actuated by an electric clock to start at an adjustable preset time have been widely used and gas operated ovens of the same general nature have been marketed, although less successfully.

Such devices of the prior art have been satisfactory for the preparation of foods consisting of solid meat, such as roast meat, fowl, and even whole vegetables, such as baked potato, squash, and the like, but it is unsafe and therefore impractical to use them for the preparation of cut or comminuted foods because of the fact that such foods must preferably be kept under refrigeration at all times when not actually being cooked. This is because in the cutting and comminuting processes, such as preparing hash, meat stuffings, hamburgers, and especially creamed and fish based casserole dishes, the mixing and cutting disperses throughout the body of the food any bacteria of spoilage which may have entered or been present in the food. When such foods remain unrefrigerated in warm weather, even for the relatively short time of a few hours, dangerous growth of such toxic organisms as salmonella and staphylococcus can occur, and give rise to toxic contaminants.

It is this serious limitation of the versatility of the automatically cooking ovens of the prior art mentioned above which has militated against their more extensive use, and it is this limitation which applicants overcome by means of their instant invention, herein.

Domestic refrigerators require insulated walls in order to make their requirements for power consumption sufficiently moderate to be practical. Cork, kapok, bagasse and even sawdust have been extensively used for the purpose. Ovens, on the other hand, require insulation both for purposes of avoiding the discomfort accompanying heavy heat losses in the summer, and in order to make possible accurate automatic heat control. Glass fibers or slag fibers are the commonly used oven insulating materials, and while they are successful for comfort and control purposes, when used to construct an oven, they are ineffective for refrigeration use because of the impractically great wall thicknesses which would be required in order to obtain sufficient insulating value to reduce operating costs of the refrigerator to an acceptable value.

Traditional insulating materials of the kind used in refrigerators, as mentioned above are organic materials which although they possess excellent insulative properties, are entirely incapable of withstanding the sustained high temperatures required of an oven insulating material without deterioration.

It thus is clear that no way has heretofore been apparent whereby a device usable as a refrigerator also could be used as an accurately temperature controlled oven, because of the differing requirements of a structural material regularly used in each case.

It is not to be assumed that no possible insulating material could have been found which would accomplish this dual purpose of satisfactorily insulating both an oven and a refrigerator, but with the two technologies in the hands of different manufacturers and an entirely satisfactory market existing for each product, it was not felt to be urgent or necessary to develop the combination in view of the apparent difficulty of the insulation problem and a lack of appreciation of the advantages to be obtained.

We have found that by using unconventional insulating materials the combination of oven and refrigerator can be made without excessive expense for operating costs, and at the same time further advantages of superior heat control, automatic broiling and effective food warming facilities can be provided.

Silicon dioxide in a form known as silica gel has been found to have satisfactory properties for this use but it has a tendency to settle unless it is somewhat compacted at the time of installation. It is therefore preferred to apply the material while the device is being vibrated so that settling will occur as the insulating material is poured into place between the inner and outer walls of the device. Magnesia and an appropriate form of aluminum oxide also are capable of providing satisfactory insulation, and an extremely fine form of glass fibers, much finer than that commonly employed for oven insulation, also is effective.

A clearer understnding of the invention may be had from the following detailed description of a specific illustrative example, wherein.

Turning now to the drawings, wherein like numbers refer to like parts in the several figures, there is seen a container 1 having interior walls 2 of insulating material, such as silica gel, magnesia, extra fine glass or slag fibers, or other suitable heat resisting insulating material of high insulating value.

Figure 1:
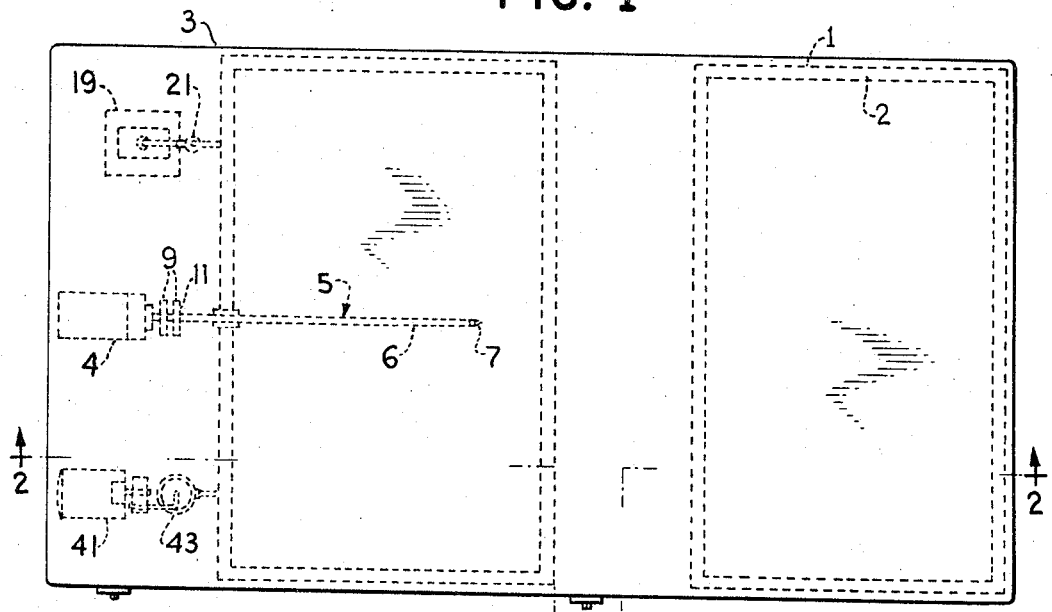
FIG. 1 is a top view of the invention.
Figure 2:
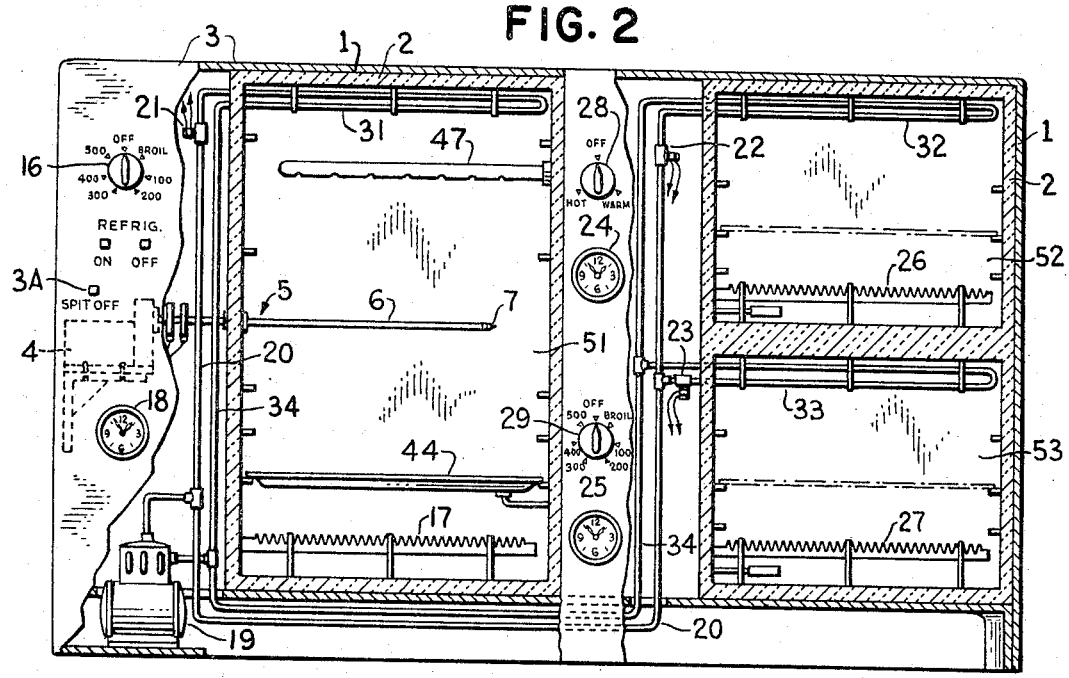
FIG. 2 is a front view of the invention.
Figure 3:
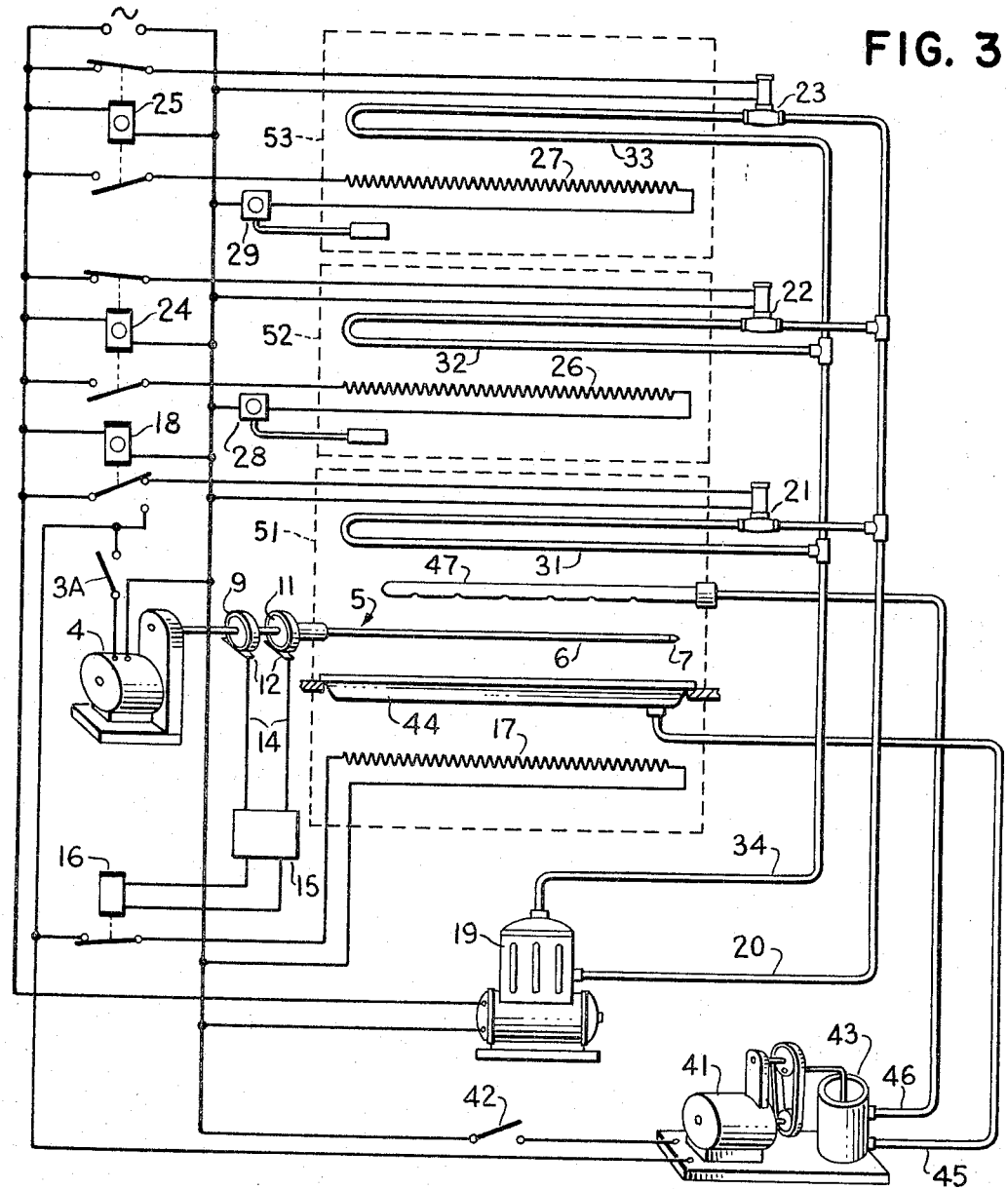
FIG. 3 is a wiring diagram of the invention.
Figure 4:
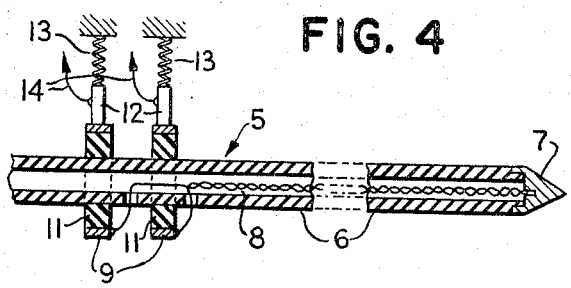
FIG. 4 is a detailed drawing of a slip ring assembly including a spit.

A metal case 3 supports a switch 3A and slow speed motor 4 coupled through a bearing and slip ring assembly 5 to a revolving shaft 6. The slip ring assembly 5 is seen in FIG. 3 and FIG. 4 to consist of a hollow shaft 6 comprising a rotatable spit and having a pointed electrical temperature sensing device 8 such as a thermocouple, whose lead wires are led out through holes in the shaft 6 to slip rings 9 spaced from the shaft by insulating material 11. Brushes 12 are held in contact with the slip rings 9 by springs 13 and have lead wires such as 14 for actuating a relay 15 to control the electrically operated switch 16 for turning off the rotisserie or radiant type of heating element 17 upon the attainment of a sufficiently high internal temperature, corresponding to doneness, within a roast or other food (not shown) impaled on the shaft 6. A clock switch, settable for operation of the switch at a desired future time, 18, causes the alternative operation of the above described rotisserie device, or the refrigeration mechanism next to be described.

A refrigeration compressor of the ordinary kind 19 has an outlet pipe 20 in which are located solenoid refrigerant valves 21, 22 and 23, under control of clock switches 18, 24 and 25. At all times prior to the time that each of the said clock switches is preset to operate and initiate the cooking cycle by its corresponding electric heater 17, 26 or 27, the said refrigerant valves are held in the open position by energization through the corresponding switch. As soon as the preset time to commence cooking occurs, according to the time for which the clock switch has been manually preset, the corresponding refrigerant valve is deenergized so as to close off the supply of refrigerant and the corresponding electric heater is energized under control, however, of the corresponding temperature actuated switch 16, 28, or 29.

The refrigerant flowing through the respective solenoid valves from the pipe 20 circulates through coils 31, 32 and/or 33, respectively (according to which of such valves are open at a given time), and returns through pipe 34 to refrigeration compressor 19. Since broiling is usually best done accompanied by continuous basting of the food so that the extracted juices are continuously discharged over the food, a basting pump motor 41 under control of a switch 42 is provided to operate the basting pump 43 which withdraws extracted juices from the drip pan 44 through inlet pipe 45 and discharges them through pipe 46 into the perforated manifold 47, from which they drip downward over the food and again into the drip pan 44.

The drip pan 44 and the manifold 47 referred to are seen to be loacted in the roasting oven 51, while a plurality of simpler ovens 52 and 53 also are provided, so that a plurality of foods all having widely different cooking times may be programmed to become done simultaneously at a desired time.

It will be observed that by the instant construction, a sufficient thickness of insulative material necessarily is provided surrounding the food chambers to ensure adequate refrigeration, and that such an amount is entirely adequate to retain the relatively moderate temperature elevation required for food "warming" or "holding" for a long period of time. It thus is possible, after cooking in one of the chambers is completed, simply to shut off the electricity to the heater therein by means of a preset operation of the clock switch, relying on the excellent insulative properties of the chamber walls to keep the food at serving temperature for several times as long as otherwise would be expected. This is accomplished without the use of any additional electrical or thermostatic controls which would add to the complexity and expense of the invention, and without the expenditure of further fuel energy.

Although this invention has been described in terms of a single illustrative example of what is considered to be the best means of practicing the invention, it is evident that various modifications and substitutions such as ultrasonic or microwave cooking will occur to those skilled in the art which do not, however, depart from the essential spirit of the invention and it is therefore intended that the invention shall not be limited merely to the material shown and described herein, but only by the appended claim.

We claim:

A food preparation device having plural food reception chambers with inner and outer walls, inner wall cooling tubes comprising controllable chamber refrigerant circulating means each including a solenoid tube shutoff valve, and a refrigerant condensing means connected for maintaining reduced chamber temperature upon solenoid energization, electric chamber heater means in a plurality of said chambers and first clock-controlled switch means connected thereto and to a said shutoff valve of said chamber for maintaining a preset elevated chamber temperature starting at a first predetermined clock set start-of-cooking time and for lowering said chamber temperature at a first preset end-of-cooking time, motorizedly rotatable spit means having a hollow interior in at least a second said chamber, located in cooking relationship to a said heater means and adapted for food impalement and rotation, electrical food interior temperature sensing means within the hollow of said spit means, and manually presettable detection and control means slidingly connected to said sensing means and to said heater means for deenergization control thereof upon detection of attainment of a preset internal food temperature, further clock controlled switch means connected to a said heater means in said second chamber and to said motorized spit means and to the said shutoff valve of said chamber for initiating rotating spit cooking at a second predetermined clock set start-of-cooking time, spitted food basting means comprising an underlying tray, and pump means connected thereto and operative to pump basting fluid from said tray to an outlet over said spit, and oven heat resisting inter-wall insulation having a thermal insulating value substantially exceeding that of asbestos.

References Cited

UNITED STATES PATENTS

| | | | |
|---|---|---|---|
| 1,848,440 | 3/1932 | Spitzenberger et al. | 165—26 |
| 1,949,629 | 3/1935 | Arkema | 165—12 X |
| 2,054,728 | 9/1936 | Martin | 165—24 |
| 2,449,874 | 9/1948 | Bruning | 165—12 X |
| 2,504,794 | 4/1950 | Berman et al. | 165—12 |
| 2,608,191 | 8/1952 | Schmidt et al. | 62—331 X |
| 2,616,269 | 11/1952 | Reynolds | 165—12 |
| 2,634,749 | 4/1953 | Cone | 137—587 |
| 2,787,948 | 4/1957 | Mathis | 99—421 |
| 2,813,478 | 11/1957 | Popple | 99—346 |
| 2,821,903 | 2/1958 | Allen et al. | 99—338 |
| 2,853,205 | 9/1958 | Boyd | 165—12 X |
| 3,091,946 | 6/1963 | Kesling | 62—465 |
| 3,224,361 | 12/1965 | Ojelid | 99—332 |
| 3,259,056 | 7/1966 | King | 99—325 |

FOREIGN PATENTS 1,359,015  3/1964  France.

OTHER REFERENCES

Industrial and Engineering Chemistry July 1939, page 827.

BILLY J. WILHITE, *Primary Examiner.*